United States Patent
Kawashima et al.

(10) Patent No.: US 7,035,180 B2
(45) Date of Patent: Apr. 25, 2006

(54) OPTICAL INFORMATION RECORDING REPRODUCING APPARATUS AND RECORDING METHOD

(75) Inventors: Tooru Kawashima, Mito (JP); Yasuhisa Koide, Hitachinaka (JP); Toshio Satou, Hitachinaka (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 459 days.

(21) Appl. No.: 10/222,471

(22) Filed: Aug. 15, 2002

(65) Prior Publication Data

US 2003/0133378 A1  Jul. 17, 2003

(30) Foreign Application Priority Data

Jan. 15, 2002  (JP) .............................. 2002-005670

(51) Int. Cl.
*G11B 5/09*  (2006.01)

(52) U.S. Cl. ................ 369/47.14; 369/47.5; 369/47.51

(58) Field of Classification Search ............ 369/47.14, 369/47.5, 47.51, 47.52, 47.53, 53.15, 53.16, 369/53.17, 53.31, 53.35, 53.36, 53.37
See application file for complete search history.

(56) References Cited

U.S. PATENT DOCUMENTS

| 6,067,284 A | * | 5/2000 | Ikeda et al. ................. 369/116 |
| 6,269,062 B1 | * | 7/2001 | Minemura et al. ....... 369/47.53 |
| 6,292,448 B1 | * | 9/2001 | Yoshida et al. .......... 369/53.27 |
| 6,515,949 B1 | * | 2/2003 | Masaki et al. ........... 369/53.11 |

FOREIGN PATENT DOCUMENTS

| JP | 11-039687 A | 2/1999 |
| JP | 11-039803 A | 2/1999 |
| JP | 2000-105924 A | 4/2000 |
| JP | 2000-251254 A | 9/2000 |
| JP | 2001-105924 | 4/2001 |

* cited by examiner

*Primary Examiner*—William Korzuch
*Assistant Examiner*—Van Pham
(74) *Attorney, Agent, or Firm*—Townsend and Townsend and Crew LLP

(57) ABSTRACT

An attempt is made to prevent an adequate recording power detection lag from being generated according to data from a defective area at trial writing, by detecting a defective area portion based on a fluctuation of return light when a trial write recording mark is formed, recording it in another portion under the same conditions as the detected portion, and using the information on the recorded area instead of the area in which the defective area was detected at reproduction of the trial writing.

16 Claims, 13 Drawing Sheets

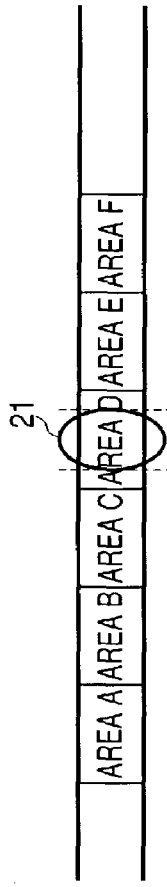
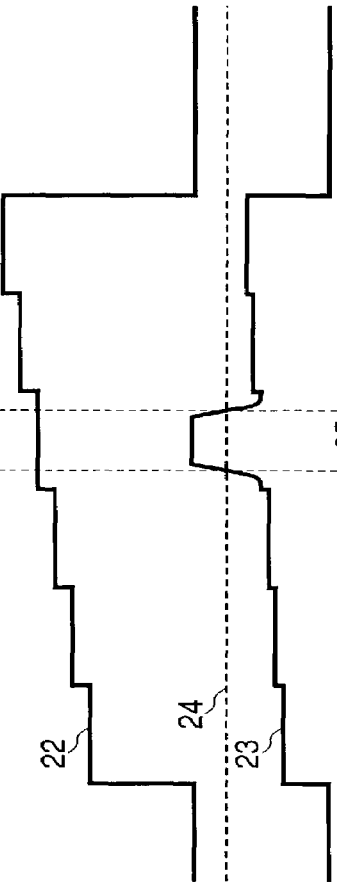
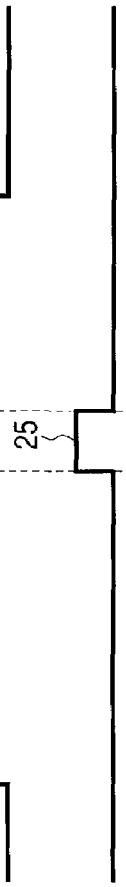
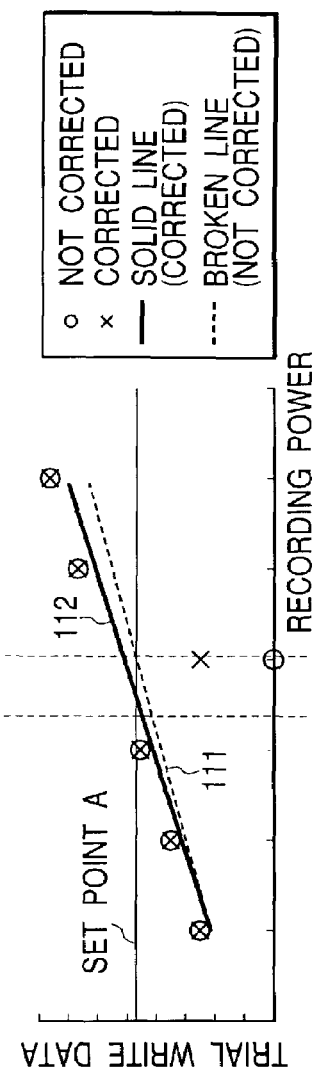
FIG. 11A TRIAL WRITE AREA
FIG. 11B RECORDING POWER
FIG. 11C DISC RETURN LIGHT (MEAN VALUE)
FIG. 11D DEFECTIVE AREA DETECTION SIGNAL
FIG. 11E REPRODUCTION SIGNAL WAVEFORM
FIG. 11F TRIAL WRITE DATA

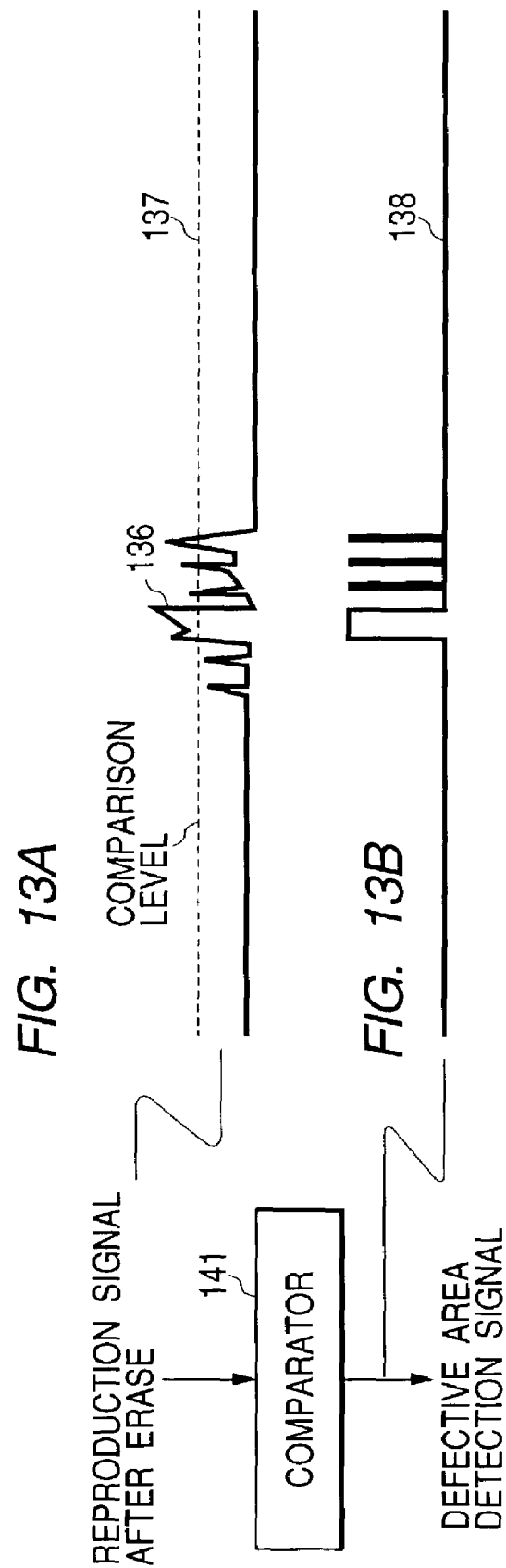

OPTICAL INFORMATION RECORDING REPRODUCING APPARATUS AND RECORDING METHOD

BACKGROUND OF THE INVENTION

1. Field of the Invention

The present invention relates to a recording method for a recording medium, such as an optical disc, and a recorder.

2. Description of the Related Art

Various apparatuses that record data by irradiating a medium, such as a disc, with laser beam are realized. For example, there is an apparatus that records the data by irradiating a disc of a compact disc (CD) type and a disc called a Digital Versatile Disc (DVD) with the laser beam modulated using the data to be recorded.

To record data using the laser beam, for example, as described in Japanese Patent Laid-Open No. 2000-251254, the laser beam power, specifically, recording power or erasing power must be set for an adequate value. Accordingly, usually, in a recorder, discrimination operation of the optimum laser power called OPC (optimum power control) is performed. This OPC operation performs trial writing by irradiating a trial write area (test area) prepared on the disc with the laser beam varying the laser power and discriminates the optimum laser power by monitoring the qualities (for example, jitter information, error rate information, and asymmetry information) of the reproduction information on the trial write portion. The OPC operation enables recording operation using the optimum laser power at recording.

Moreover, as trial write operation, as described in the DVD-RAM standard, not only the optimization of the recording power by the OPC but also the suitability of recording pulse width is performed to suppress the effects of the distortion of an optical spot on an optical disc and the thermal interference of a recording mark and form a recording mark of higher quality. The trial writing is performed varying recording pulse width in accordance with a combination of the recording mark and space width and the operation that discriminates the optimum recording pulse width is performed by monitoring the qualities (for example, jitter information, error rate information, and asymmetry information) of the reproduction information on the trial write portion.

If there is a defective portion, such as a scratch or dirt, in the trial write area, the signal quality monitored in the OPC operation will be affected by the scratch. This causes a fault in the operation that discriminates the optimum laser power according to the OPC operation and no adequate discrimination operation will be able to be executed. Accordingly, there is a method for avoiding a defective area in the trial write area and selecting an area to be used with reference to the trial write area management information.

This method checks the defective area in the beginning of use and registers the defective portion, such as the scratch or dirt, as the trial write area management information. Further, the scratch or dirt adheres to an optical disc when it is used and a new defective area may occur. On this occasion, when the quality of the reproduction information on the trial write operation is checked, a new defective portion is detected, but the reproduction information recorded in the defective portion is not used. In this case, however, the information on recording conditions recorded in the defective portion is lost and adequate discrimination operation will be disabled.

Moreover, position information on the detected defective portion must be added to the trial write area management information so that the adequate discrimination operation will be enabled at next trial writing. In this case, the trial write area management information will be additionally recorded or rewritten. Consequently, however, time is consumed at that rate and the operation including data recording is delayed, thereby sacrificing convenience as a recorder.

To solve the above problem, in Japanese Patent Laid-Open No. 2000-105924, a method for detecting a defective area during trial write operation and performing the recording again in another area under the same conditions as an area in which the defective area was detected is proposed. As a defective area detection method, as described in paragraph 52 of the same Japanese Patent Publication, the defective area is detected by decreasing a level of a reproduction signal RF using the reproduction signal RF in the space portion behind a recording area (mark portion) in which trial write information was recorded.

SUMMARY OF THE INVENTION

As described in the above Japanese Patent Disclosure No. 2000-105924, a method that detects a defective area using a reproduction signal RF in a space portion behind a recording area or between the recording areas in which trial write information was recorded is effective for such defect area that intercepts the amount of laser beam with which a recording film, such as dust that adhered to a disc surface, is irradiated. For example, however, in the adhesion of a fingerprint and the deterioration of a phase change recording film, because the amount of laser beam with which the recording film is irradiated does not decrease or change, a level decrease in the reproduction signal RF in the space portion is not remarkable and the defective area becomes difficult to detect accordingly. The fingerprint affects a wide range in comparison with dust and greatly affects a result of trial writing.

When there are a fingerprint adhesion portion, a recording film peeling portion, and a deterioration portion that are inadequate for a trial write area, no defective area may be detected in a change of the return light from a disc of the space portion during recording. In that case, no adequate recording is performed and discrimination operation of adequate trial writing will be disabled.

One object of the present invention takes into consideration of these problems and is to provide a recording technique that can set an adequate recording characteristic in the trial write operation, enables high quality recording operation, and can perform efficient trial write operation.

Another object of the present invention is to provide a recording technique that can improve the quality of trial writing by performing the trial writing to another area or preventing the information on the defective portion from being used when the trial writing to the defective area was performed to eliminate a defective area of a disc and the deterioration of the disc for the trial write operation.

To solve the above problems and attain the above objects, the present invention detects a defective area, such as a fingerprint adhesion portion that adhered to an optical disc, a recording film peeling portion, and a deterioration portion, from a change in the reflected light of a recording mark portion from the optical disc when the trial write operation is recorded and performs the recording again in another area under the recording conditions when the defective area was detected. When the trial write operation is reproduced, the information on the area in which the defective area was detected is not used, but the information on another area in which the recording was performed again is used.

Moreover, the defective area that was detected during recording is registered in a specific area of the optical disc or a nonvolatile memory of a recorder after the trial writing is completed. Subsequently, to perform the trial writing, an attempt is made to perform efficient trial write operation by reading the information on the previously registered defective area before the trial writing and preventing the portion from being used for the trial writing.

Specifically, in a first invention, an optical information recording reproducing apparatus is provided with a first trial write recording means that irradiates a trial write area of a recording medium with high power laser beam and records trial write information, a trial write reproducing means that irradiates the trial write area with low power laser beam and records the trial write information, a laser power discrimination means that discriminates the power of the laser beam most suitable for data recording based on trial write reproduction information obtained from the trial write reproducing means, a defective area detection means that detects a defective area included in the trial write area from information on the return light from the recording medium using the high power laser beam when the trial write information is recorded, and a second trial write recording means that performs the recording of the trial write information again in another area that is within the trial write area and differs from the defective area detected by the defective area detection means.

In a second invention, the optical information recording reproducing apparatus is provided with a trial write recording means that irradiates a trial write area of a recording medium with high power laser beam and records trial write information, a trial write reproducing means that irradiates the trial write area with low power laser beam and reproduces the trial write information, a laser power discrimination means that discriminates the power of the laser beam most suitable for data recording based on trial write reproduction information obtained from the trial write reproducing means, a defective area detection means that detects a defective area included in the trial write area from information on the return light from the recording medium using the high power laser light when the trial write information is recorded, and an information deletion means that deletes the reproduction information of the defective area detected by the defective area detection means from the information obtained by the trial write reproduction means.

In a third invention, the optical information recording reproducing apparatus is provided with a trial write recording means that irradiates a trial write area of a recording medium with high power laser beam and records trial write information, a trial write reproducing means that irradiates the trial write area with low power laser beam and reproduces the trial write information, a laser power discrimination means that discriminates the power of the laser beam most suitable for data recording based on the trial write reproduction information obtained from the trial write reproducing means, a laser beam emission time discrimination means that discriminates the laser beam power most suitable for the data recording, a defective area detection means that detects a defective area included in the trial write area from the information on the return light from the recording medium using the high power laser beam when the trial write information is recorded, a defective area width detection means that discriminates the size of a defective area, and an information limiting means that applies a limit to the trial write information input to the laser power discrimination means and the laser beam emission time discrimination means in accordance with the size of the defective area.

In a fourth invention, the optical information recording reproducing apparatus is provided with a trial write recording means that irradiates a trial write area of a recording medium with high power laser beam and records trial write information, a trial write reproducing means that illustrates the trial write area with low power laser beam and reproduces the trial write information, a laser power discrimination means that discriminates the power of the laser beam most suitable for data recording based on trial write reproduction information obtained from the trial write reproduction means, a laser beam emission time discrimination means that discriminates emission time of the laser beam most suitable for the data recording, an erasing means that erases information on a recording area after trial writing, a reproducing means that reproduces the area after erasing, a defective area detection means that detects a defective area from the reproduction information obtained by the reproducing means, a storage means that stores a site of the defective area, and a trial write protection means that prevents the stored area from being used for the trial writing.

In a fifth invention, the optical information recording reproducing apparatus is provided with a trial write recording means that irradiates a trial write area of a recording medium with high power laser beam and records trial write information, a first reproducing means that irradiates the trial write area with low power laser beam and records the trial write information, a laser power discrimination means that discriminates the power of the laser beam most suitable for data recording based on trial write reproduction information obtained from the trial write reproducing means, a deletion means that deletes information on a recording area after trial writing, a second reproducing means that reproduces the area after erasing, a defective area detection means that detects a defective area from the reproduction information obtained by the second reproducing means, a storage means that stores a site of a defective area, and a recording prohibition means that prohibits the recording of the defective area.

In a sixth invention, the optical information recording reproducing apparatus is provided with a first recording means that irradiates a recording medium with high power laser beam and records information, a defective area detection means that detects a defective area included in a recording area from the information on return light coming from the recording medium using the high power laser beam during recording, a defective area width detection means that discriminates the size of the defective area, and a second recording means that performs the recording of recorded information again in another recording area that differs from the recording area.

In a seventh invention, a recording method is provided with the steps of performing trial writing to multiple trial write areas by varying laser power, detecting a defective area of the trial write area using the laser beam return light by the trial writing, and performing the trial writing again to another trial write area using the same laser power as the laser power with which the defective area was irradiated.

In an eighth invention, a recording method is provided with the steps of performing trial writing to multiple trial write areas by varying laser power, detecting a defective area of the trial write area using the laser beam return light by the trial writing, storing the defective area and re-prohibiting the trial writing, reproducing data recorded in the trial write area, and correcting the reproduced data and discriminating the optimum laser power when there is the defective area.

These and other objects, features and advantages of the invention will be apparent from the following more particular description of preferred embodiments of the invention, as illustrated in the accompanying drawings.

BRIEF DESCRIPTION OF THE DRAWINGS

FIG. 2A shows a trial write area, FIG. 2B shows recording power, FIG. 2C shows the mean value of disc return light, FIG. 2D shows a defective area detection signal, and FIG. 2E shows a reproduction signal waveform.

FIG. 4A shows return light (a reproduction signal) from an optical disc when long and short marks are recorded, FIG. 4B shows the return light (reproduction signal) from the optical disc of the long and short marks in a portion to which transparent foreign matter, such as the fingerprint, adheres, FIG. 4C shows a sampling signal, FIG. 4D shows the reproduction signal when it is recorded, FIG. 4E shows sampling output, and FIG. 4F shows a defective area detection signal.

FIG. 5A shows the return light (reproduction signal) from the optical disc when the long and short marks are recorded, FIG. 5B shows the return light (reproduction signal) from the optical disc of the long and short marks in the portion to which the transparent foreign matter, such as the fingerprint, adheres, FIG. 5C shows sampling signal A, FIG. 5D shows sampling signal B, FIG. 5E shows the reproduction signal that is being recorded, FIG. 5F shows the sampling output, and FIG. 5G shows the defective area detection signal.

FIG. 6A shows the return light (reproduction signal) from the optical disc when the long and short marks are recorded, FIG. 6B shows the return light (reproduction signal) from the optical disc of the long and short marks in the portion to which the transparent foreign matter, such as the fingerprint, adheres, FIG. 6C shows the sampling signal A, FIG. 6D shows the sampling signal B, FIG. 6E shows the reproduction signal when it is recorded, FIG. 6F shows the sampling output, and FIG. 6G shows the defective area detection signal.

FIG. 7A shows the trial write area, FIG. 7B shows the recording power, FIG. 7C shows the mean value of the disc return light, FIG. 7D shows the defective area detection signal, and FIG. 7E shows the reproduction signal waveform.

FIG. 9A shows the trial write area, FIG. 9B shows the recording power, FIG. 9C shows the mean value of the disc return light, FIG. 9D shows the defective area detection signal, and FIG. 9E shows the reproduction signal waveform.

FIG. 11 is a waveform chart and a characteristic drawing showing a fourth embodiment of the operating waveform of each related portion at the OPC operation in the optical disc recording reproducing apparatus according to the present invention. FIG. 11A shows the trial write area, FIG. 11B shows the recording power, FIG. 11C shows the mean value of the disc return light, FIG. 11D shows the defective area detection signal, and FIG. 11E shows the reproduction signal waveform. FIG. 11F is the characteristic drawing of trial write data for describing a defective area correction method.

FIG. 13 is an operating waveform chart for describing the fourth embodiment of the defective area detection method. FIG. 13A shows the reproduction signal after the optical disc is erased and FIG. 13B shows the defective area detection signal.

DESCRIPTION OF THE PREFERRED EMBODIMENTS

The embodiments of the present invention are described below with reference to the drawings.

A first embodiment of the present invention is described using FIGS. 1 to 6.

Figure 1:
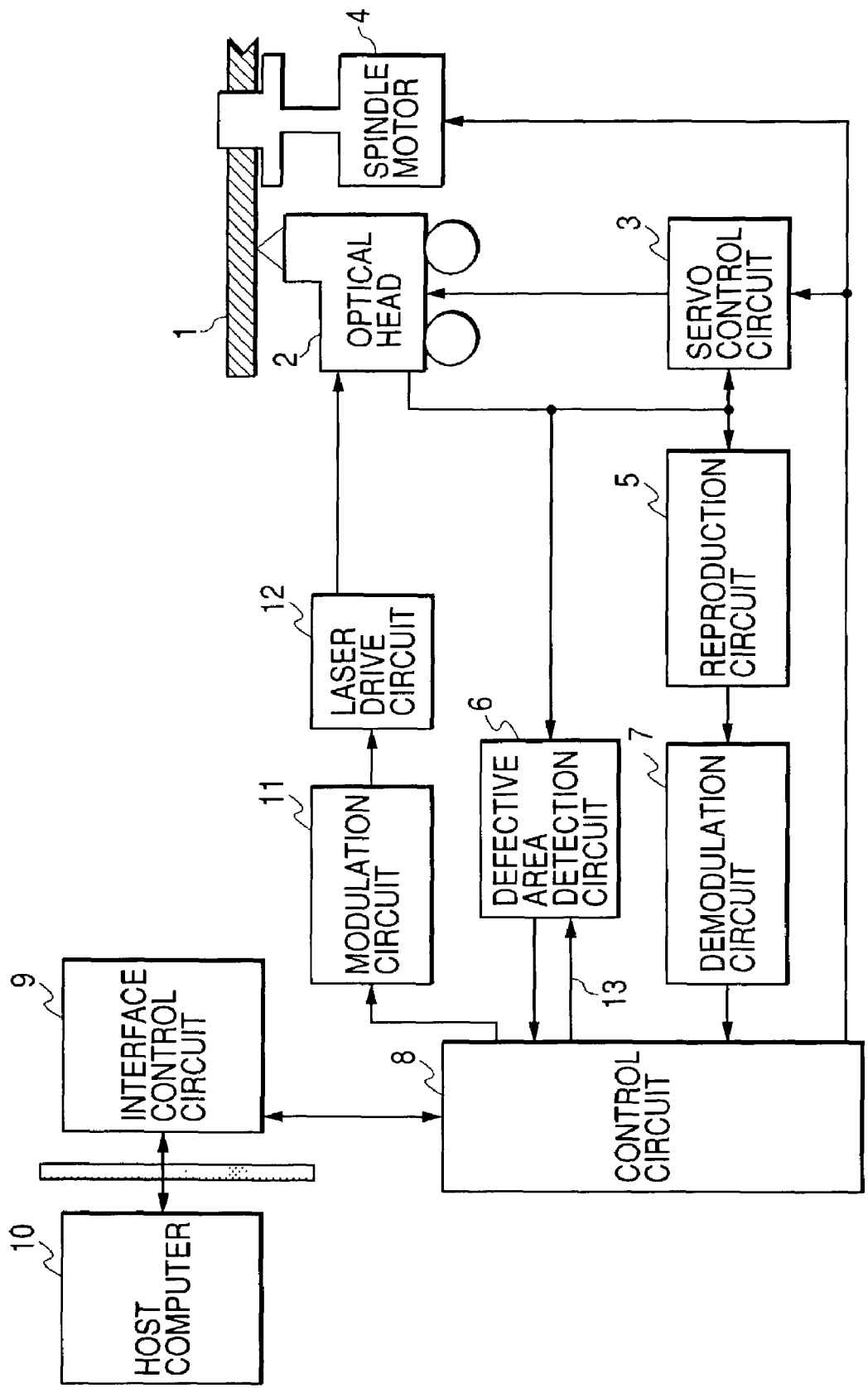
FIG. 1 is a block diagram of one embodiment of an optical disc reproducing apparatus according to the present invention.

FIG. 1 is a block diagram showing one embodiment of an optical disc recording reproducing apparatus according to the present invention. As an optical disc loaded on the optical disc recording reproducing apparatus of the present invention, for example, a disc of a CD type, such as a CD-R or a CD-RW, and a disc called a DVD (Digital Versatile Disc) are considered. The present invention can apply to even a recorder that corresponds to another type of the optical disc.

In FIG. 1, an optical disc 1 rotates by a spindle motor 4 at a predetermined speed of rotation. An optical head 2 is controlled by a servo control circuit 3 and laser beam is condensed at a predetermined position of the optical disc 1. Information recorded on the optical disc 1 is detected using the reflected light from the optical disc 1. An RF signal that is reproduction data, and both a focus error signal and a tracking error signal for servo control are obtained from the detected information. The former signal is input to a reproduction circuit 5 and the latter signals are input to the servo control circuit 3. Further, the detected information is input to a defective area detection area 6 and an optical disc defective area is detected. The defective area detection circuit 6 detects the defective area according to a signal level of the return light from the optical disc 1 with a sampling signal 13 that corresponds to a mark portion that is being recorded from a control circuit 8. The servo control circuit 3 applies filter processing to the above focus error signal and tracking error signal in accordance with an instruction from the control circuit 8 and controls the optical head 2, thereby condensing laser beam at the predetermined position of the optical disc 1. The RF signal is converted to a binary signal through the reproduction circuit 5 and input to a demodulation circuit 7, and then demodulated here. The demodulated reproduction binary signal is input to the control circuit 8 and sent to a host computer 10 consisting of a personal computer (PC) or the like via an interface circuit 9. For data recording, the optical head 2 is controlled by the servo control circuit 3 according to an instruction of the control circuit 8 and laser beam is condensed at the predetermined position of the optical disc 1 that performs recording. Subsequently, recording data passes through the interface circuit 9 from the host computer 10 and is sent from the control circuit 8 to a modulation circuit 11 via the interface circuit 9. Then the data is converted to data suitable for being recorded in the optical disc 1. A laser drive circuit 12 varies laser beam emission intensity in accordance with the converted recording data and records the data in the disc 1.

Moreover, the control circuit 8 is provided with a laser power discrimination circuit that discriminates the power of the laser beam most suitable for the data recording and a laser beam emission time discrimination circuit that discriminates emission time of the laser beam most suitable for the data recording based on trial write reproduction information obtained from the reproduction circuit 5. Further, when a defective area was defected, the modulation circuit 11 and the laser drive circuit 12 record the trial write information using the laser power recorded in the defective area in accordance with the instruction of the control circuit 8. Further, the control circuit 8 is provided with a storage means that stores a site of the defective area and issues an instruction that prohibits the defective area stored in this storage means or an information deletion instruction that deletes the information obtained from the defective area. Further, a second storage means that stores the site of another area that becomes a substitute of the defective area may also be provided in the control circuit.

To adequately record data in the optical disc 1, trial writing is performed and adequate recording power and recording pulse width must be discriminated. If there is a defective area in which dust and a fingerprint adhere to a trial write area, the amount of laser beam with which a recording film of the portion is irradiated decreases and no recording will be performed in the intended amount of laser beam. In this invention, the defective area that is being recorded is detected by the defective area detection circuit 6 and the trial writing is performed again in another area under the recording conditions in the detected defective area.

Figure 2:
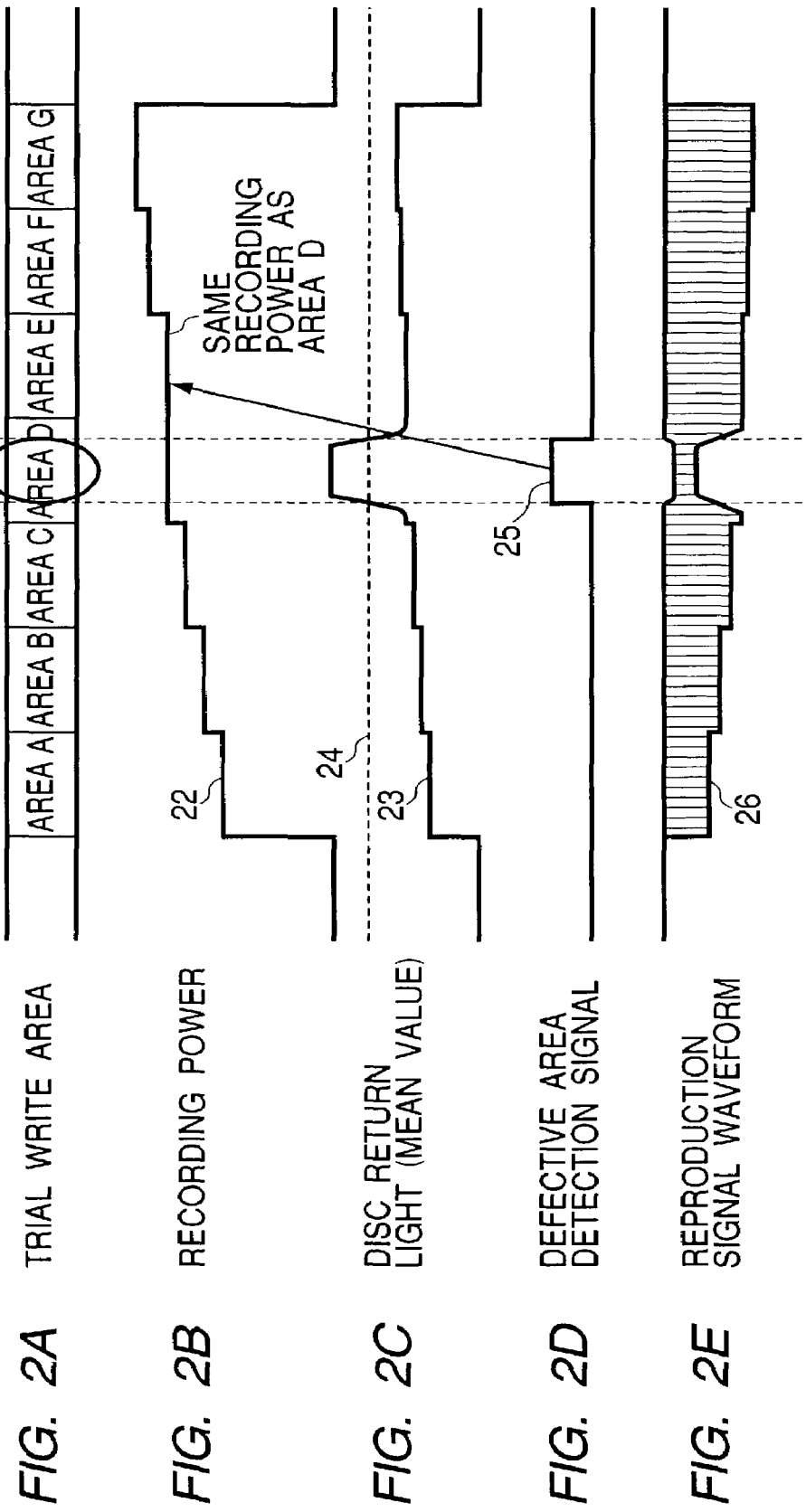
FIG. 2 is a waveform chart showing a first embodiment of an operating waveform of each related portion at OPC operation in the optical disc recording reproducing apparatus according to the present invention.

FIG. 2 is a waveform chart showing a first embodiment of an operating waveform of each related portion at OPC operation in the optical disc recording reproducing apparatus according to the present invention. FIG. 2A shows a trial write area, FIG. 2B shows recording power, FIG. 2C shows the mean value of disc return light, FIG. 2D shows a defective area detection signal, and FIG. 2E shows a reproduction signal waveform.

FIG. 2A shows trial write areas A to G and 21 indicates a defective area caused by a fingerprint adhesion portion, a recording film peeling portion, or a deterioration portion. Numeral 22 of FIG. 22B is recording power and indicates a peak level of a rectangular recording pulse in each area. Recording is performed from the area A by sequentially increasing a peak level of a recording pulse little by little. Because the reflectance of an optical disc decreases in the process in which a recording mark is formed with the recording pulse, the amount of the disc return light that corresponds to each recording pulse becomes a high level in the recording pulse head portion and reaches a low level as the recording mark is formed. Numeral 23 of FIG. 2C indicates the mean level of the disc return light that is being recorded and a detection signal of the disc return light can be obtained by passing through a smooth circuit and a low pass filter. In the area D, no recording mark is formed because of the defective area 21. The amount of the disc return light that corresponds to each recording pulse is kept in the high level and the mean level 23 of the disc return light reaches the high level. Accordingly, the defective area 21 can be detected by comparing a signal of the mean level 23 of the disc return light with that of a predetermined slice level 24. Numeral 25 of FIG. 2D indicates a defective area detection signal detected in this manner. If the width of the defective area is narrow, a little effect is produced when the optimum laser power is determined. Accordingly, only when the defective area is larger than predetermined width, it may also be handled as a defective area. Consequently, a defective area width detection circuit that discriminates the size of the defective area may also be provided. Various publicly-known circuits can be used as circuits that measure pulse width.

When the defective area D is detected, recording is performed with the same recording power as the area D without varying the recording power in the next trial write area E. Subsequently, the recording is performed by widening an area until the final recording power is recorded, resulting in finishing the recording. In this embodiment, because the defective area detection portion is one spot, one area is increased and the recording is completed in the recording area G. If the defective area is detected in multiple areas, a trial write area is increased at that rate.

Numeral 26 of FIG. 2E indicates a reproduction signal of the trial write information obtained after the trial write recording. No recording mark is formed in the area D in which the defective area 21 is provided and no adequate area is obtained. Accordingly, adequate power is detected using the information on the reproduction signal of the area E recorded with the same recording power as the area D without using the information on the reproduction signal of the area D.

Figure 3:
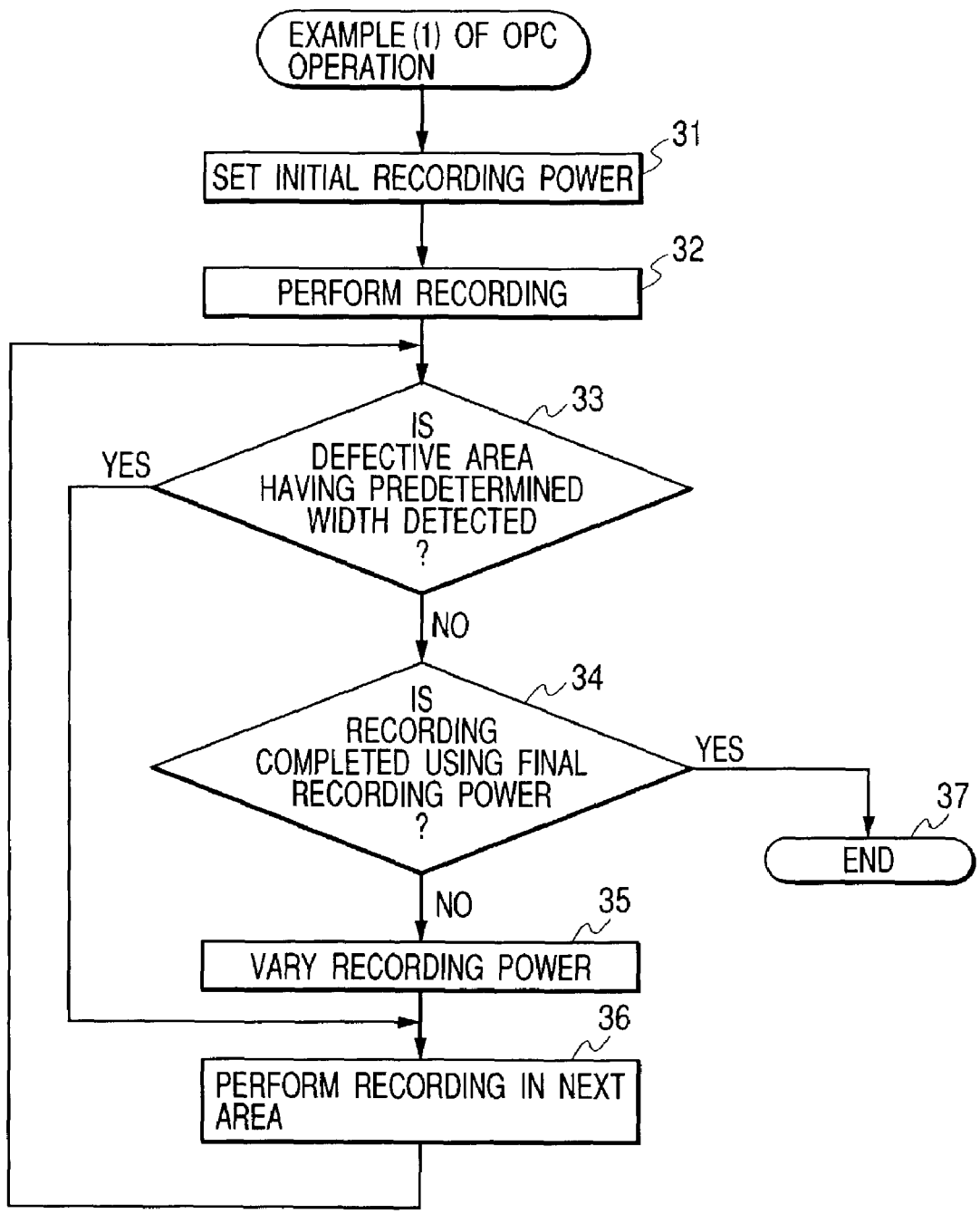
FIG. 3 is a flowchart showing the first embodiment of processing operation at the OPC operation in the optical disc recording reproducing apparatus according to the present invention.

FIG. 3 is a flowchart showing the first embodiment of the processing operation at the OPC operation in the optical disc recording reproducing apparatus according to the present invention. Firstly in step 31, the initial recording power of trial writing is set and in step 32, recording is performed in the recording area A of FIG. 2A with the initial recording power. The defective area described in FIG. 2 is detected performing the recording of the step 32. If no defective area having predetermined width was detected in step 33, processing goes to step 34 and determines whether or not the recording power is the final recording power and the recording is completed. In the determination of the step 34, if the recording power is not the final recording power, processing goes to step 35. As shown in FIG. 2B, a set point of the recording power is increased slightly and in step 36, the recording is performed in the recording area B, for example. The defective area is detected while performing the recording of the step 36, and processing returns to the step 33. As shown in FIG. 2B, when the recording is performed in this manner by sequentially increasing the peak level of the recording pulse from the area A little by little and the recording power reaches the final recording power in the determination of the step 34, processing goes to step 37 and is terminated. As described in FIG. 2, if there is a defective area in the recording power D, the defective area having the predetermined width is detected in the step 33. Accordingly, processing goes from the step 33 to the step 36 and the recording is performed in the recording area E with the same recording power as the recording area D.

Figure 4:
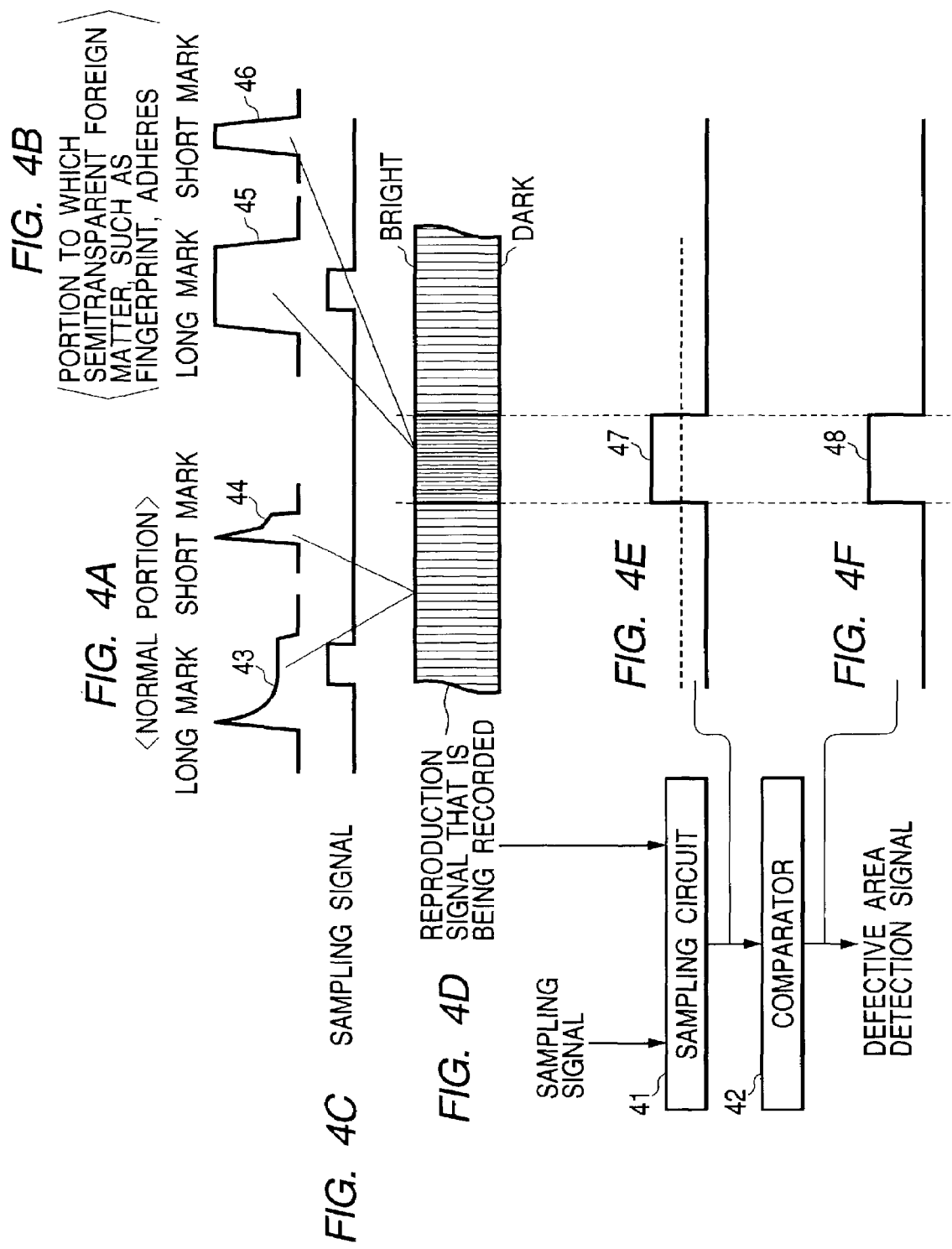
FIG. 4 is an operating waveform chart for describing the first embodiment of a defective area detection method when a fingerprint adheres to a recording area.

FIG. 4 is an operating waveform chart for describing the first embodiment of a defective area detection method when a fingerprint adheres to a recording area. FIG. 4A shows return light (a reproduction signal) from an optical disc when long and short marks are recorded, FIG. 4B shows the return light (reproduction signal) from the optical disc of the long and short marks in a portion to which the transparent foreign matter, such as the fingerprint, adheres, FIG. 4C shows a sampling signal, FIG. 4D shows a reproduction signal when it is recorded, FIG. 4E shows sampling output, and FIG. 4F shows a defective area detection signal.

FIG. 4A shows a change in the return light from an optical disc at recording and shows a reproduction signal 43 of a long mark and a reproduction signal 44 of a short mark. In the normal area to which no fingerprint adheres, as shown in the reproduction signals 43 and 44, because a recording mark is formed, the reflectance of the optical disc decreases and a signal level decreases in the later portion. On the other hand, because no recording mark can be formed in the defective area in which the fingerprint adheres to the recording area, as shown in FIG. 4B, high level reproduction signals from the beginning to the end of the recording mark, that is, reproduction signals 45 and 46 of long marks are obtained. When the later portion level of a comparatively longer recording mark is sampled and held by a sampling circuit 41, a sampling hold signal 47 is obtained. The defective area detection signal 44 that reaches a high level in the fingerprint adhesion portion is generated by comparing this sample hold signal 47 with a comparison level 43 by a comparator 42.

To detect a defective area, another configuration as well as the configuration shown in FIG. 4 can be used.

Figure 5:
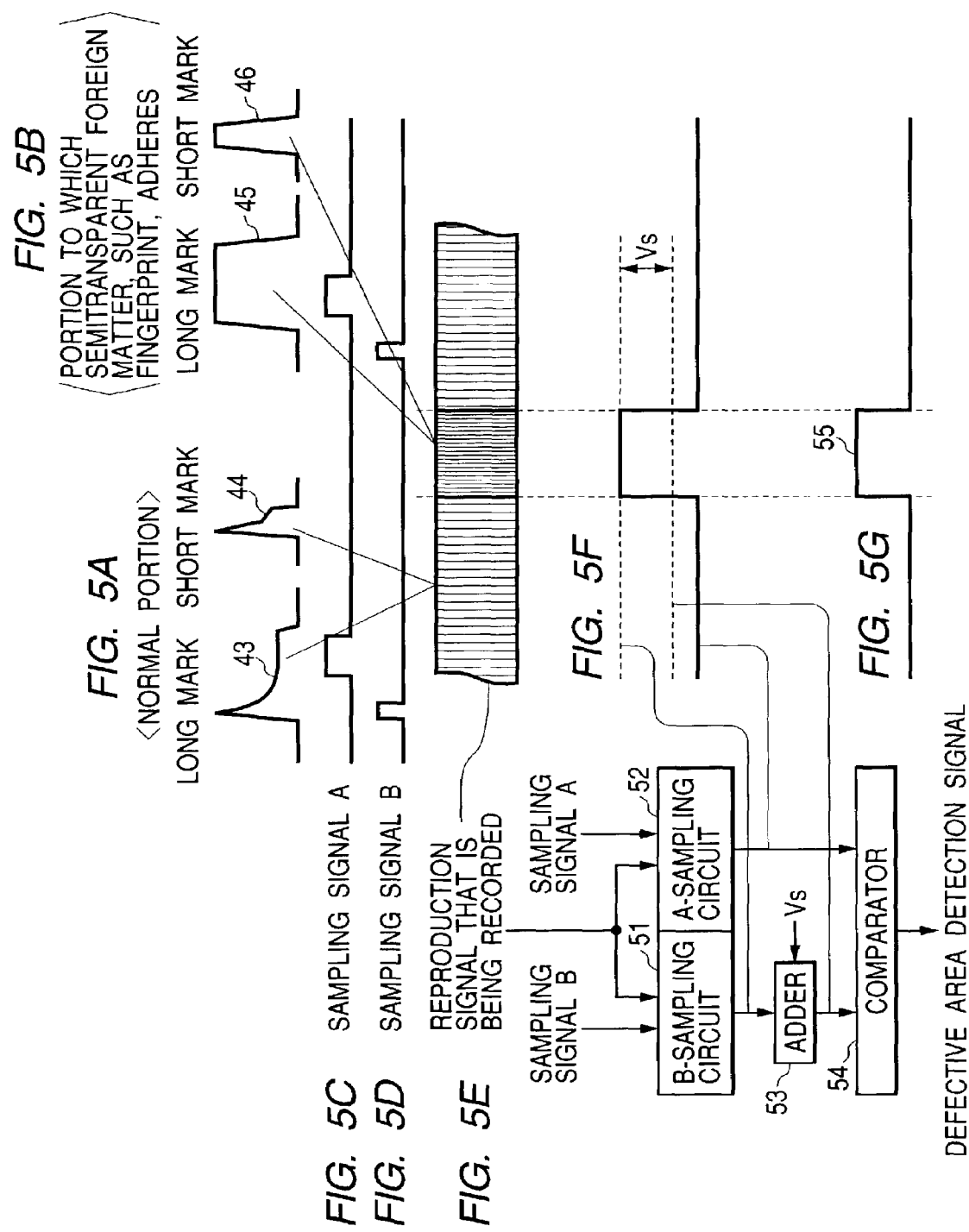
FIG. 5 is an operating waveform chart for describing a second embodiment of the defective area detection method when the fingerprint adheres to the recording area.

FIG. 5 is an operating waveform chart for describing a second embodiment of the defective area detection method when the fingerprint adheres to the recording area. FIG. 5A shows the return light (reproduction signal) from the optical disc when the long and short marks are recorded, FIG. 5B shows the return light (reproduction signal) from the optical disc of the long and short marks in the portion to which the transparent foreign matter, such as the fingerprint, adheres, FIG. 5C shows sampling signal A, FIG. 5D shows sampling signal B, FIG. 5E shows the reproduction signal when it is recorded, FIG. 5F shows the sampling output, and FIG. 5G shows the defective area detection signal.

For example, as shown in FIG. 5, the first and later portion levels of a comparatively longer recording mark are sampled by a B-sampling circuit 51 and an A-sampling circuit 52 and the output signal of the B-sampling circuit 51 is shifted by Vs by an adder 53. The output signal is compared with the output signal of the B-sampling circuit 52 by a comparator 54 and a defective area detection signal 55 in which the defective area portion reaches a high level is generated by setting an area in which the signal level of the later portion of the return light that is being recorded becomes high as a defective area portion.

Figure 6:
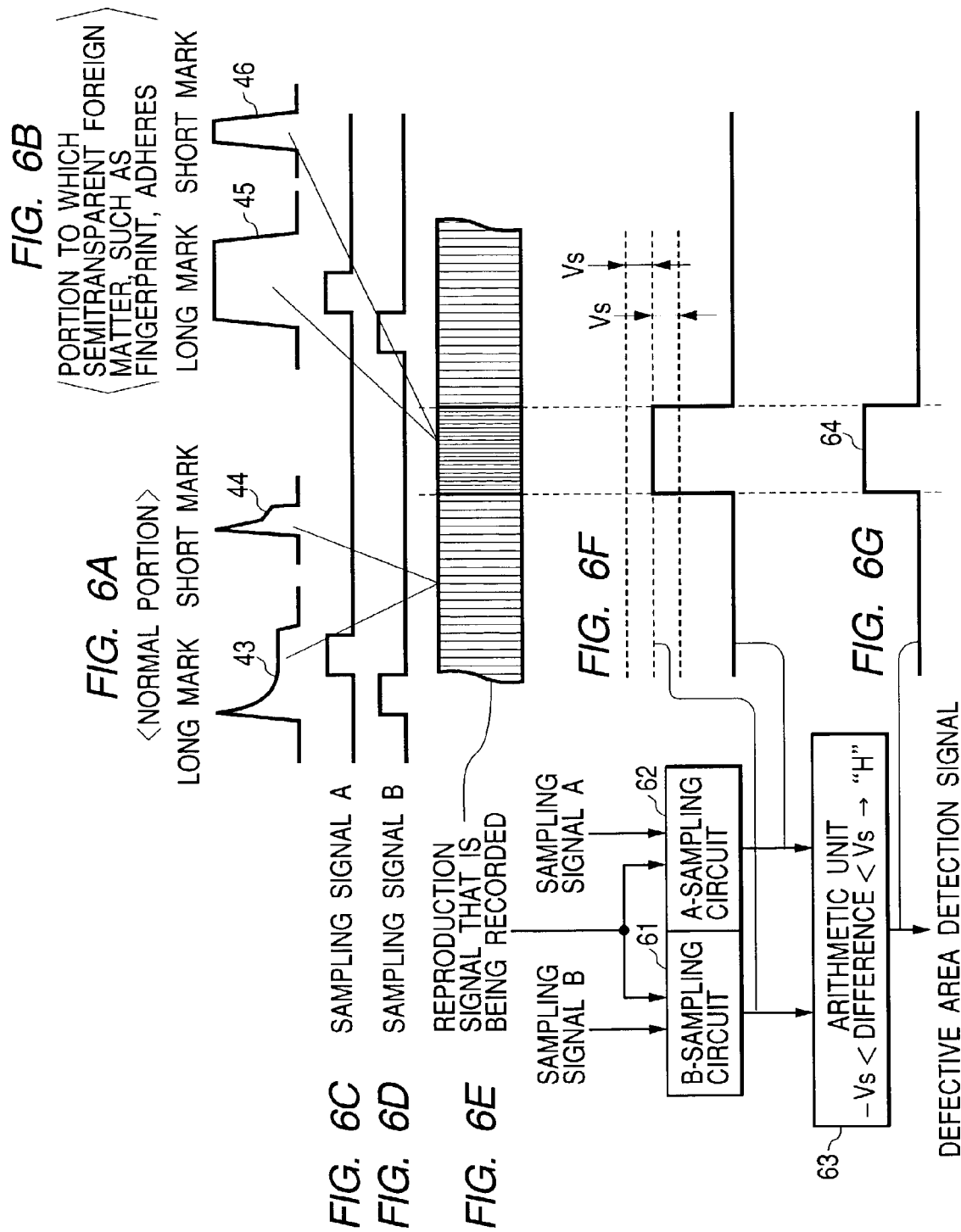
FIG. 6 is an operating waveform chart for describing a third embodiment of the defective area detection method when the fingerprint adheres to the recording area.

Moreover, another defective area detection method is shown in FIG. 6.

FIG. 6 is an operating waveform chart for describing a third embodiment of the defective area detection method when the fingerprint adheres to the recording area. FIG. 6A shows the return light (reproduction signal) from the optical disc when the long and short marks are recorded, FIG. 6B shows the return light (reproduction signal) from the optical disc of the long and short marks in the portion to which the transparent foreign matter, such as the fingerprint, adheres, FIG. 6C shows the sampling signal A, FIG. 6D shows the sampling signal B, FIG. 6E shows the reproduction signal when it is recorded, FIG. 6F shows the sampling output, and FIG. 6G shows the defective area detection signal.

Signals sampled in a B-sampling circuit 61 and an A-sampling circuit 62 are compared by an arithmetic unit 63. If the level difference between the signal from the B-sampling circuit 61 and the signal of the A-sampling circuit 62 is within the range of Vs in the drawing, the area is determined as a defective area and a defective area detection signal 64 is generated.

In the defective area detection methods shown in FIGS. 4, 5, and 6, the signal that reaches a high level in the defective area portion is assumed to be a defective area detection signal, but even a low level is allowed. Further, if a defective area is small, trial writing is hardly affected. Accordingly, whether or not it is the defective area is assumed may also be judged at the rate of the width of the detected defective area occupying the trial write area.

Moreover, a defective area may also be detected by comparing a luminous energy level of the return light from a recording medium immediately after a laser beam source started high output laser beam emission and a luminous energy level of the return light from the recording medium immediately before the laser beam source finishes the high output laser beam emission. Further, regarding the detection of the defective area, the presence of the defective area may also be determined from the luminous energy level of the return light from the recording medium immediately before the laser beam finishes the high output laser beam emission.

Figure 7:
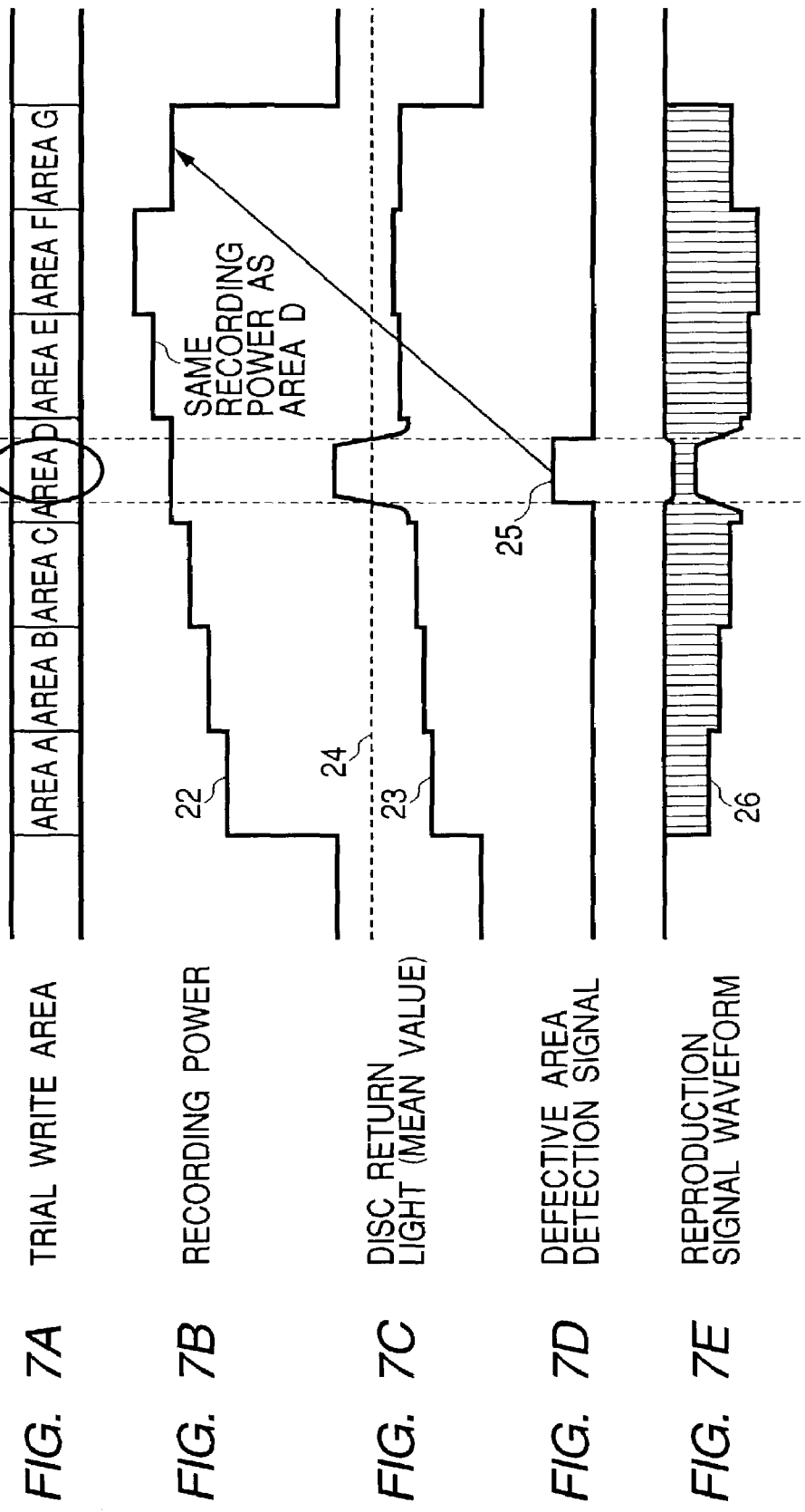
FIG. 7 is a waveform chart showing the second embodiment of the operating waveform of each related portion at the OPC operation in the optical disc recording reproducing apparatus according to the present invention.
Figure 8:
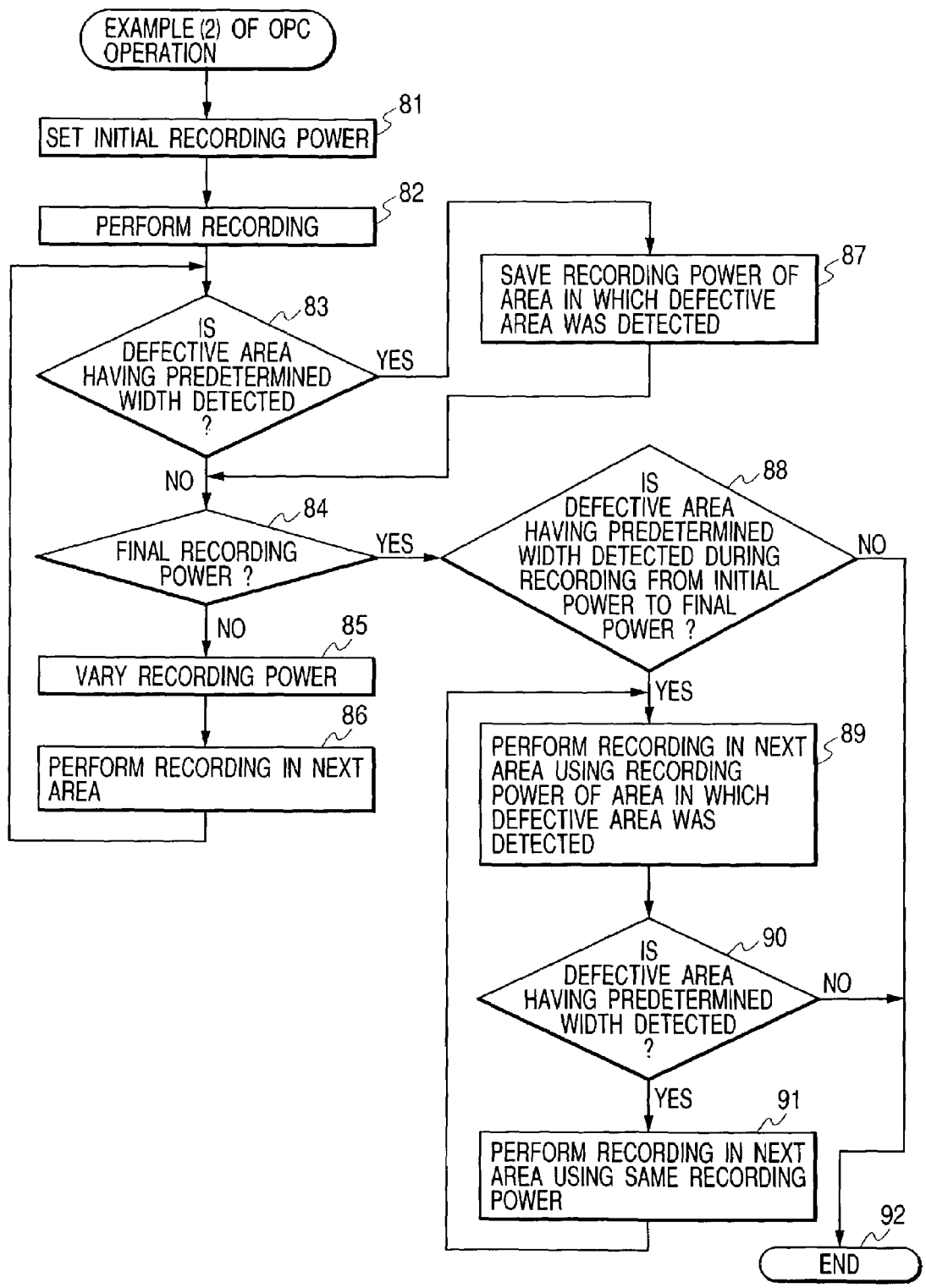
FIG. 8 is a waveform chart showing the second embodiment of the processing operation at the OPC operation in the optical disc recording reproducing apparatus according to the present invention.

Next, a second embodiment of the present invention is described using FIGS. 7 and 8.

FIG. 7 is a waveform chart showing the second embodiment of the operating waveform of each related portion at the OPC operation in the optical disc recording reproducing apparatus according to the present invention. FIG. 7A shows the trial write area, FIG. 7B shows the recording power, FIG. 7C shows the mean value of the disc return light, FIG. 7D shows the defective area detection signal, and FIG. 7E shows the reproduction signal waveform. Besides, the same symbol is assigned to the same item of the second embodiment and the explanation is omitted.

If a defective area was detected in the recording area D during recording, after recording was performed including the final recording power, the recording is performed in the area G following the final recording area F with the same recording power as the recording area D in which the defective area was detected. To reproduce the trial write area after the recording and obtain information, the information on the area D in which the defective area was detected is not used, but the information of the area G recorded with the same recording power later is used.

FIG. 8 is a flowchart showing the second embodiment of the processing operation at the OPC operation in the optical disc recording reproducing apparatus according to the present invention. Firstly in step 81, the initial recording power of trial writing is set and in step 82, recording is performed in the recording area A of FIG. 7A with the initial recording power. The defective area described in FIG. 2 is detected performing the recording of the step 82. In step 83, if no defective area having the predetermined width was detected, processing goes to step 84 and determines whether the recording power is the final recording power and the recording is completed. If the recording power is not the final recording power in the determination of the step 84, processing goes to step 85 and a set point of the recording power is increased slightly as shown in FIG. 7B. In step 86, for example, recording is performed in the recording area B. The defective area is detected performing the recording of the step 86 and processing returns to the step 83. The recording is performed in this manner by sequentially increasing the peak level of the recording pulse little by little from the area A. When the recording power reaches the final recording power in the determination of the step 84, processing goes to step 88. Because no defective area was detected from the initial recording power to the final recording power, processing goes to step 92 and terminates.

As described in FIG. 7, if there is a defective area in the recording area D, a defective area having the predetermined width is detected in the step 83 and the recording power of the area in which the defective area was detected in step 87 is saved. When the recording power reaches the final recording power in the determination of the step 84, processing goes to the step 88 and whether the defective area having the predetermined width was detected during the recording from the recording power to the final power was determined. When the defective area was detected, processing goes to step 89 and the recording is performed with the recording power of the area in which the defective area was detected that was saved in the step 87 in the area G following the area F in which recording was performed using the final recording power as shown in FIG. 7B. If no defective area having the predetermined width was detected in step 90, processing terminates in the step 92. If the defective area was detected in the step 90, the recording power is saved in step 91. Processing goes to the step 89 and recording is performed in the area following the area G with the same recording power as the recording area G. Subsequently, whether the defective area having the same width was detected again in the step 90 is performed and processing terminates if it was not be detected. If the defective area was detected, processing goes to the step 91 and is repeated until the defective area having the predetermined width is detected. Besides, the number of repetitions may also be limited.

Figure 9:
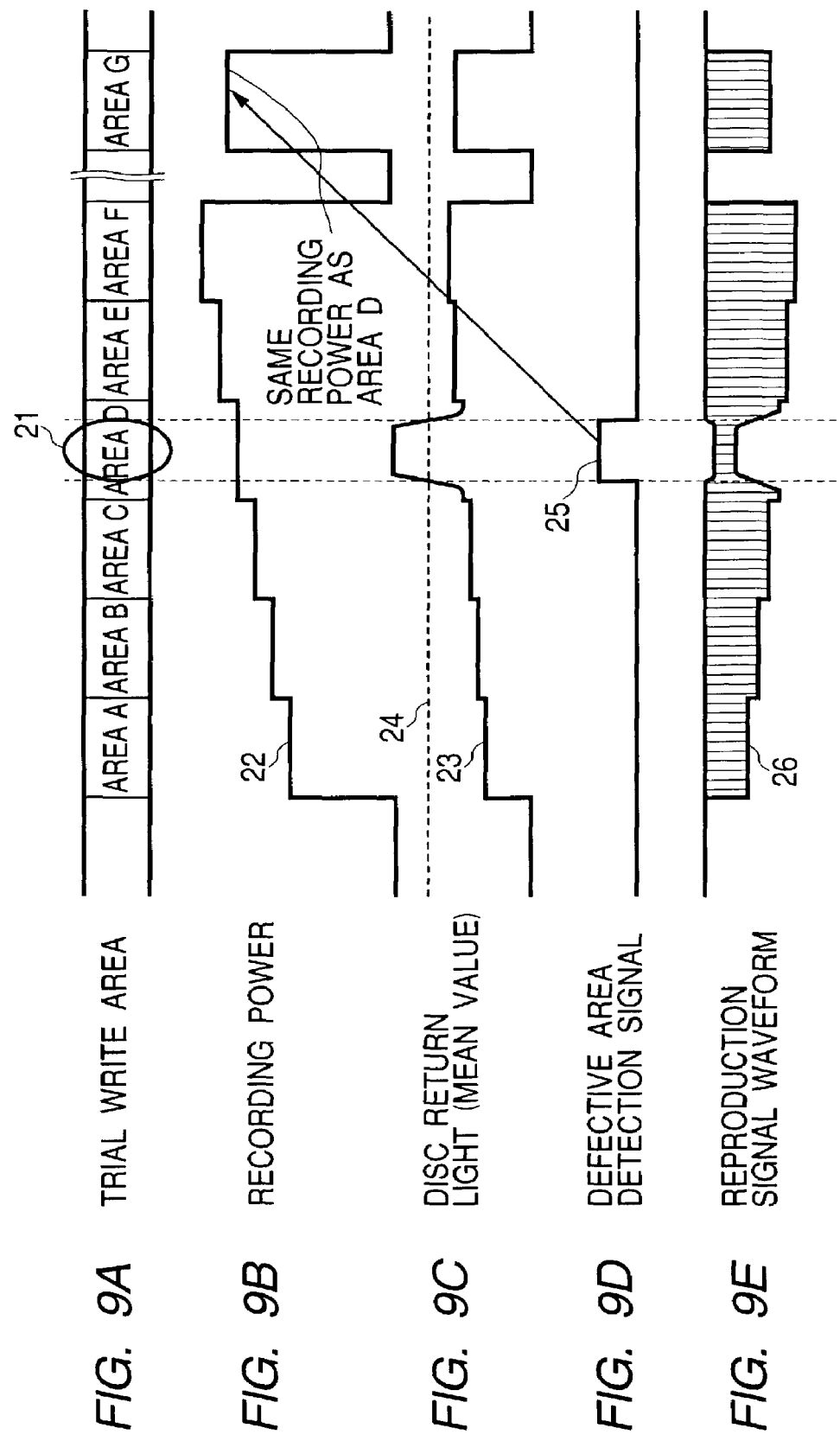
FIG. 9 is a waveform chart showing the third embodiment of the operating waveform of each related portion at the OPC operation in the optical disc recording reproducing apparatus according to the present invention.
Figure 10:
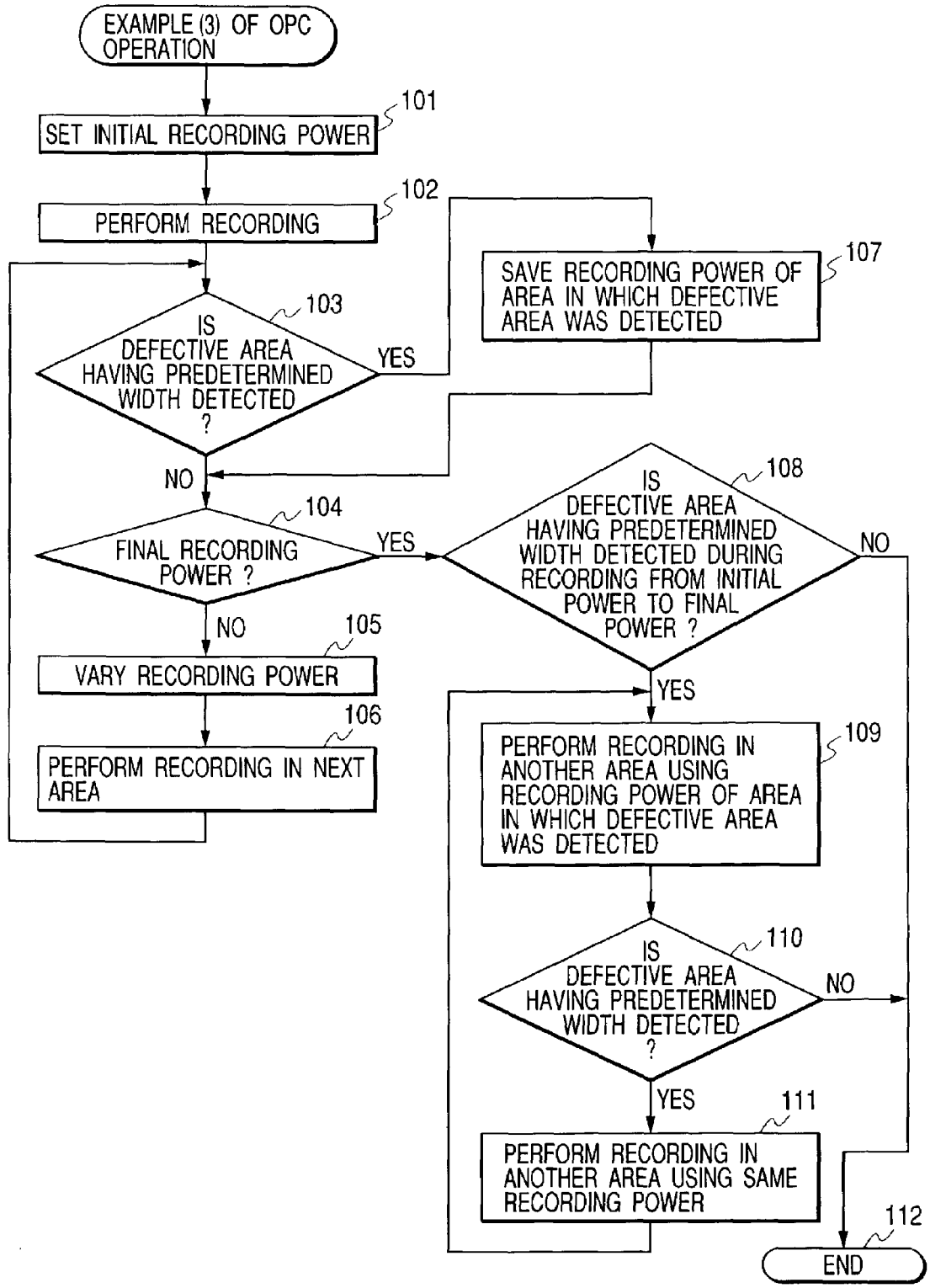
FIG. 10 is a flowchart showing the third embodiment of the processing operation at the OPC operation in the optical disc recording reproducing apparatus according to the present invention.

Next, a third embodiment of the present invention is described using FIGS. 9 and 10.

FIG. 9 is a waveform chart showing the third embodiment of the operating waveform of each related portion at the OPC operation in the optical disc recording reproducing apparatus according to the present invention. FIG. 9A shows the trial write area, FIG. 9B shows the recording power, FIG. 9C shows the mean value of the disc return light, FIG. 9D shows the defective area detection signal, and FIG. 9E shows the reproduction signal waveform. Besides, in FIG. 9, the same symbol is assigned to the same item as the second embodiment and the description is omitted.

The third embodiment differs from the embodiment of FIG. 7 in that the recording is performed in the area G that is separated from the areas A to F with the same recording power as a defective area detection portion instead of the portion in which the defective area was detected. In FIG. 9, if a defective area was detected in the recording area D during trial write recording, after the recording was performed including the final recording power, recording is performed in the recording area G separated from the final recording area F with the same recording power as the recording area D in which the defective area was detected. To reproduce the trial write area after recording and obtain information, the information of the area D in which the defective area was detected is not used, but the information of the area G recorded with the same recording power later is used.

FIG. 10 is a flowchart showing the third embodiment of the processing operation at the OPC operation. Firstly in step 101, the initial recording power of trial writing is set and in step 102, recording is performed in the recording area A of FIG. 9A with the initial recording power. The defective area described in FIG. 2 is detected performing the recording of the step 102. In step 103, if no defective area having the predetermined width was detected, processing goes to step 104 and determines whether or not the recording power is the final recording power and the recording is completed. If the recording power is not the final recording power in the determination of the step 104, processing goes to step 105 and a set point of the recording power is increased slightly as shown in FIG. 9B. In step 106, for example, the recording is performed in the recording area B. The defective area is detected performing the recording of the step 106 and processing returns to the step 103. The recording is performed in this manner by sequentially increasing the peak level of the recording pulse little by little from the area A. When the recording power reaches the final recording power in the determination of the step 104, processing goes to step 108. Because no defective area was detected from the initial recording power to the final recording power, processing is terminated at step 112. As described in FIG. 9, if there is a defective area in the recording area D, a defective area having the predetermined width is detected in the step 103 and the recording power of the area in which the defective area was detected in step 107 is saved. When the recording power reaches the final recording power in the determination of the step 104, processing goes to the step 108 and it is determined whether or not the defective area having the predetermined width was detected during the recording from the recording power to the final power. When the defective area was detected, processing goes to step 109 and the recording is performed in the arbitrary area G as shown in FIG. 9B with the recording power of the area in which the defective area was detected and saved in the step 107. If no defective area having the predetermined width was detected in step 110, processing terminates in the step 112. If the defective area was detected in the step 110, the recording power is saved in step 111. Processing goes to the step 109 and the recording is performed in the arbitrary area with the same recording power as the recording area G. Subsequently, whether the defective area having the same width was detected again in the step 110 is determined and processing is terminated in the step 112, if it was not detected. When the defective area was detected, processing goes to the step 111 and is repeated until no defective area having the predetermined width is detected. Besides, the number of repetitions may also be limited.

Moreover, the portion in which the defective area was detected is registered in a specific area of a disc or a memory of a recorder. To perform trial writing next, the quality of a trial write reproduction signal can be improved by performing the recording except the area or preventing the information on the area from being used even if the recording is performed.

Moreover, because the dust that adhered to a disc surface widely affects the radial direction of the disc, the recording is performed except the area in the direction in which a defective area was detected or the information on the area may also be prevented from being used even if the recording is performed.

Figure 12:
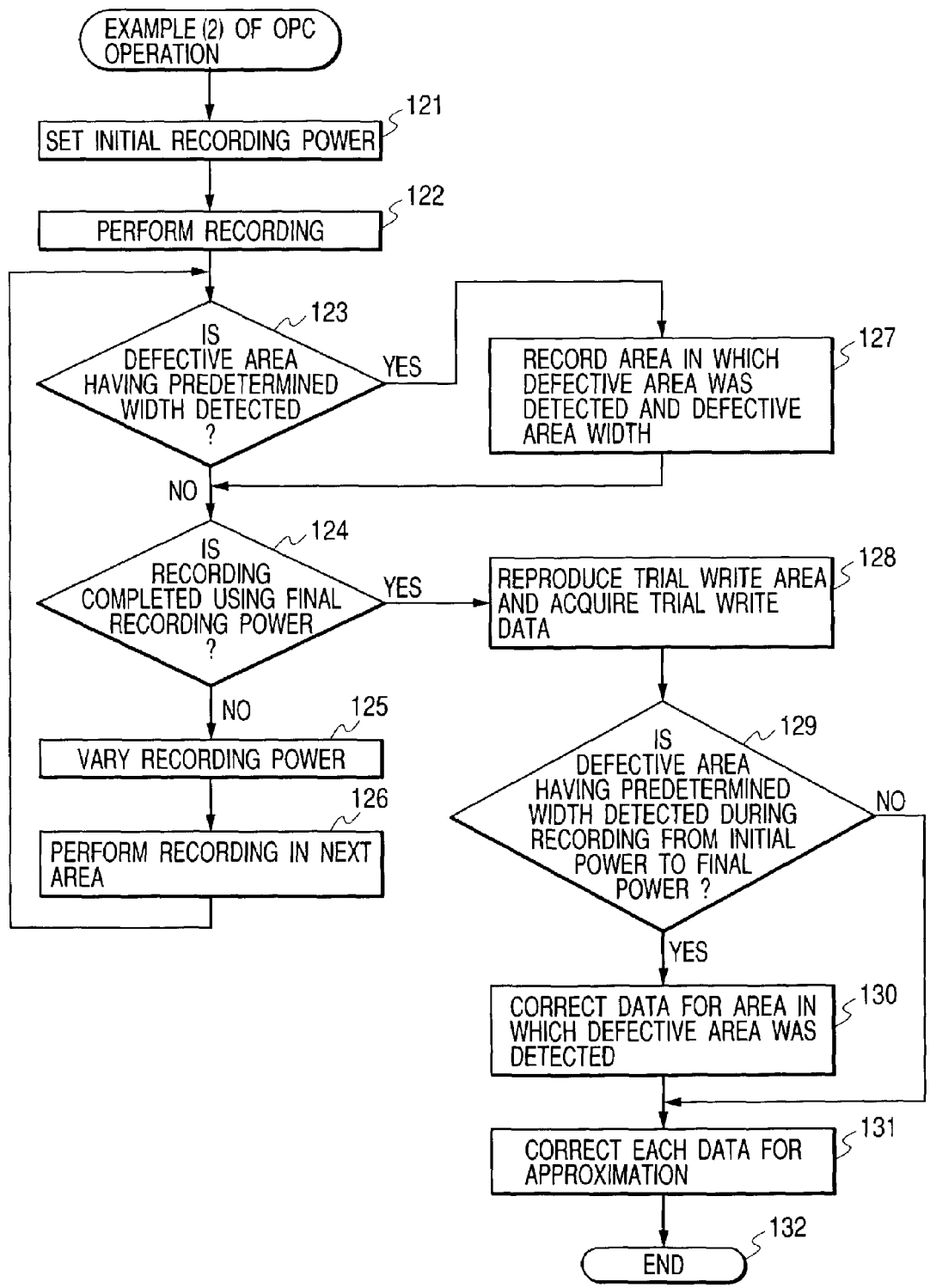
FIG. 12 is a flowchart showing the fourth embodiment of the processing operation at the OPC operation.

Next, a fourth embodiment of the present invention is described using FIGS. 11 and 12.

FIG. 11 is a waveform chart and a characteristic drawing showing the fourth embodiment of the operating waveform of each related portion at the OPC operation in the optical disc recording reproducing apparatus according to the present invention. FIG. 11A shows the trial write area, FIG. 11B shows the recording power, FIG. 11C shows the mean value of the disc return light, FIG. 11D shows the defective area detection signal, and FIG. 11E shows the reproduction signal waveform. FIG. 11F is the characteristic drawing of trial write data for describing a defective area correction method, and shows the recording power on the horizontal axis and the trial write data (detected trial write signal level) on the vertical axis.

As shown in FIG. 11, when the recording area is fixed, recording is not performed again in another area, but the area in which the defective area exceeding the predetermined width was detected is stored during recording. The trial write data obtained by reproducing the trial write area is corrected by varying a degree of weighing on the reliability of the data in the presence of the defective area.

For example, when the case in which the recording power of set point A is obtained is assumed, the recording power on the horizontal axis and the trial write data on the vertical axis are assumed to result in that the mean value of the adjacent three points of the trial write data of each area is marked by a circle (O). Usually, because there are measurement errors, linear approximation and quadratic curve approximation are performed and the recording power for the set point is obtained. This embodiment shows an example in which the linear approximation was performed. The area D has no continuity with the areas before and behind in the defective area portion. In this embodiment, the data of the defective area portion is corrected to the mean value to the set point marked by an (X), thereby suppressing the effect of the defective area. The case of the circle (O) in which the data is not corrected is shown by a broken line 111, and when the corrected value (X) is used, it is shown by a solid line 112. Accordingly, the trial write data of the defective area portion is estimated using the solid line 112.

In this embodiment, the mean value with the set point is used, but correction data may also be used by varying the rate between the defective area portion data and the set point. For example, the rate may also be varied in accordance with the defective area width. That is, the trial write reproduction information that is input to a laser power discrimination circuit and a laser beam emission time discrimination means provided in the control circuit 8 may also be varied in accordance with the size of the defective area.

Moreover, when a defective area included in the trial write area was detected from the return light information from a recording medium using high power laser beam during the recording of trial write information, an attempt may also be made to delete the defective area reproduction information using the information obtained by reproducing the trial write information.

FIG. 12 is a flowchart showing a fourth embodiment of the processing operation at the OPC operation. Firstly in step 121, the initial recording power of trial writing is set and in step 122, recording is performed in the recording area A of FIG. 11A with the initial recording power. The defective area described in FIG. 2 is detected performing the recording of the step 122. In step 123, if no defective area having the predetermined width was detected, processing goes to step 124 and determines whether the recording power becomes the final recording power and the recording is completed. If the recording power is not the final recording power in the determination of the step 124, processing goes to step 125 and the set point of the recording power is increased slightly as shown in FIG. 11B. In step 126, for example, recording is performed in the recording area B. The defective area is detected performing the recording of the step 126 and processing returns to the step 123. The recording is performed in this manner by sequentially increasing the peak level of the recording pulse little by little from the area A. When the recording power reaches the final recording power in the determination of the step 124, processing goes to step 128. The recorded trial write area is reproduced and trial write data is acquired. If no defective area was detected from the initial recording power to the final recording power, processing goes to step 131 and the trial write data is corrected for linear approximation or nth-order curve approximation. The recording power that reaches a set point of the trial write data is obtained and processing terminates in step 132. As described in FIG. 11, if there is a defective area in the recording area D, the defective area having the predetermined width is detected in the step 123 and in step 127, the area in which the defective area was detected and the defective area width are saved. When the recording power reaches the final recording power in the determination of the step 124, processing goes to the step 128. The recorded trial write area is reproduced and the trial write data is acquired. When the defective area was detected in the step 129, processing goes to step 130 and the trial write data of the defective area is corrected. Regarding a correction method, for example, as shown in FIG. 11F, the data of the area in which the defective area was detected is corrected to the value by averaging, at the rate of the defective area width occupying the area, the trial write data and set point of the area D in which the defect area was detected.

If the defective area width is a % of the area, it is set to a corrected value shown in expression (1).

$$\text{Corrected value} = \text{Trial write data value} \times a\% + \text{Set point} \times (100-a)\% \quad (1)$$

The trial write data of the area in which the defective area was detected is substituted for the corrected value and processing goes to step 131. The trial write data is corrected for linear approximation or nth-order curve approximation and the recording power that reaches the set point of the trial write data is obtained, and then processing is terminated in step 132.

As the data correction method, to handle the mean value of three points consisting of this point and the points before and behind as the data, the data may also be corrected by varying the rate of the data averaged in the defective area portion and the non-defective area portion.

In the embodiment shown in FIG. 11, although the defective area portion is detected during recording, some conventional embodiments correct the data by detecting the defective area portion during reproduction. The defective area is detected during recording because it is easier to detect during recording according to the defective area. Besides, both results of the defect area detection during recording and the defective area detection during reproduction may also be used.

The defect area detection method when the optical disc is a phase change disc is described with reference to FIG. 13.

FIG. 13 is an operating waveform chart for describing the fourth embodiment of the defective area detection method. FIG. 13A shows the reproduction signal after the optical disc is erased and FIG. 13B shows the defective area detection signal. When a rewritable optical disc in which a recording medium can record and erase information, such as a phase change, as a detection method of the defective area portion, as shown in FIG. 13, a reproduction signal 136 after it is erased is compared with a comparison level 137 by a comparator 141 and a defective area detection signal 138 is obtained, thereby detecting a defective area. This is because, in a rewritable medium, its recording film deteriorates and will not return to the original state if the number of rewriting times increases. For example, although a phase change film changes to a crystalline state and an amorphous state, it will not return to the crystalline state if the number of rewriting times increases. This occurs even in a state in which the number of rewriting times is low as the recording power increases. As described in OPC, when the recording power is varied and the recording is performed, the recording film does not deteriorate evenly, but a difference occurs depending on an area. Accordingly, due to the deterioration of the recording film, the difference occurs in the trial write data and adequate detection is disabled. Hereupon, in this embodiment, the reliability of trial writing is improved by detecting an area in which the recording film is deteriorated due to the defective area detection, recording the area in a recorder or disc as a defective area previously, and preventing the area from being used for the trial writing. Further, when the detection method of the defective area portion of FIG. 13 is used even in a Write at Once type medium of which the recording medium is a DVD-R or CD-R, a defective area, such as a peeled recording film, can be checked previously.

Besides, the defective area detection method in a recording mark portion that is performing recording according to the present invention may also be used when normal information is recorded. For example, a DVD-RAM performs the recording by specifying 16 sectors as a unit of one block. If a defective area is detected in a sector in the defective area detection method of the embodiment of FIG. 4, FIG. 5 or FIG. 6, the same information as the area in which the defective area was detected is recorded in the next sector. At the same time, it is stored that recording was performed again and the area in which the recording was performed again. After the recording, the area in which the recording was performed again is recorded in the specific area of the optical disc. The recorded information is reproduced by selecting the information on the area in which there was no defective area detection and the area in which the recording was performed again. Further, the recorded defective area is registered as a Send Defect List or P defect List so that recording will be disabled or processing may also be applied as a recording disabled area. In this embodiment, the method using the DVD-RAM was described, but even another type of media can be accepted.

As described above, according to the present invention, if there is a defective area on a disc in trial writing, no adequate signal is obtained from there. Accordingly, inadequate recording power can be prevented from being obtained. Further, the quality of subsequent trial writing can be improved by registering the defective area portion in the disc and recorder and preventing the use of the defective area.

Conventionally, although information has been missed due to the defective area, that was usually suppressed by increasing the number of trial write areas and averaging the effect in the defective area. According to this invention, even if the trial writing is performed in the necessary minimum area, the trial write area can effectively be used because the information is not missed and detected incorrectly due to the defective area. In such a Write at Once disc in particular, because the number of trial writing times is increased, the recording quality is improved, such as allowing the trial writing in accordance with a temperature change.

Moreover, when the defective area detection method of the present invention is used at normal recording, it is known that no adequate recording mark was formed during the recording even if the recording area is reproduced after the recording, but no reproduction quality is checked. Accordingly, the lack of recorded information is prevented because the same information as the defective area detection area can be recorded again later.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes that come within the meaning and range of equivalency of the claims are therefore intended to be embraced therein.

What is claimed is:

1. An optical information recording reproducing apparatus, comprising:
    a first trial write recording unit that irradiates a trial write area of a recording medium with mark recording power laser beam and records trial write information;
    a trial write reproducing unit that irradiates said trial write area with reproducing power laser beam and reproduces the trial write information;
    a laser power discrimination unit that discriminates power of laser beam most suitable for data recording based on trial write reproduction information obtained from said trial reproduction unit;
    a defective area detection unit that detects a defective area included in said trial write area from information on return light coming from the recording medium using the mark recording power laser beam that is recording the trial write information;
    a second trial write recording unit that re-records the trial write information in another area that is within said trial write area and differs from said defective area detected by said defective area detection unit; and
    a laser beam emission time discrimination unit that discriminates laser beam emission time most suitable for the data recording,
    wherein said trial write reproducing unit comprises:
        a first trial write reproducing unit that irradiates said trial write area with the reproducing power laser beam and reproduces the trial write information; and
        a second trial write reproducing unit that irradiates said another area with the reproducing power laser beam and reproduces the trial write information,
    wherein said laser power discrimination unit discriminates the power of the laser beam power most suitable for the data recording based on the trial write reproduction information obtained from said first trial write reproducing unit and the trial write reproduction information obtained from said second trial write reproducing unit, and
    said laser beam emission time discrimination unit discriminates the laser beam power most suitable for the data recording.

2. The optical information recording reproducing apparatus according to claim 1, further comprising a first storage unit that stores a site of said defective area, a recording prohibition unit that prohibits said defective area stored in said storage unit from being recorded or an information deletion unit that deletes information obtained from said defective area.

3. The optical information recording reproducing apparatus according to claim 1, further comprising a second storage unit that stores the site of said another area.

4. The optical information recording reproducing apparatus according to claim 1, wherein said second trial write recording unit is constructed so that the trial write information can be re-recorded in the area following said defective area detected by said defective area detection unit.

5. An optical information recording reproducing apparatus, comprising:
a trial write recording unit that irradiates a trial write area of a recording medium with high power laser beam and records trial write information;
a trial write reproducing unit that irradiates said trial write area with low power laser beam and reproduces the trial write information;
a laser power discrimination unit that discriminates power of laser beam most suitable for data recording based on trial write reproduction information obtained from said trial write reproducing unit;
a laser beam emission time discrimination unit that discriminates emission time of the laser beam most suitable for the data recording;
a defective area detection unit that detects a defective area included in said trial write area from information on the return light coming from said recording medium using the high power laser beam that is recording the trial write information;
a defective area width detection unit that discriminates the size of the defective area; and
an information limiting unit that applies a limit to said trial write reproduction information that is input to said laser power discrimination unit and said laser beam emission time discrimination unit in accordance with the size of the defective area.

6. An optical information recording reproducing apparatus, comprising:
a first trial write recording unit that irradiates a trial write area of a recording medium with mark recording power laser beam and records trial write information;
a trial write reproducing unit that irradiates said trial write area with reproducing power laser beam and reproduces the trial write information;
a laser power discrimination unit that discriminates power of laser beam most suitable for data recording based on trial write reproduction information obtained from said trial reproduction unit;
a defective area detection unit that detects a defective area included in said trial write area from information on return light coming from the recording medium using the mark recording power laser beam that is recording the trial write information;
a second trial write recording unit that re-records the trial write information in another area that is within said trial write area and differs from said defective area detected by said defective area detection unit;
an erasing unit that erases information on a recording area after trial writing instead of said second trial write recording unit;
a reproduction unit that reproduces an area after erase;
a defective area detection unit that detects a defective area from reproduction information obtained by said reproducing unit;
a storage unit that stores the site of said defective area; and
a trial write protection unit that prohibits said recorded area from being used for the trial writing.

7. The optical information recording reproducing apparatus according to claim 6, further comprising a recording prohibition unit that prohibits said defective area from being recorded.

8. The optical information recording reproducing apparatus according to claims, 5, 6, or 7,
wherein said defective area detection unit is constructed so that the defective area can be detected by comparing a luminous energy level of the return light from a recording medium immediately after a laser beam source started high output laser beam emission and a luminous energy level of the return light from the recording medium immediately before the laser beam source finishes the high output laser beam emission.

9. The optical information recording reproducing apparatus according to claims, 5, 6, or 7, wherein said defective area detection unit is constructed so that the presence of the defective area can be discriminated from the luminous energy level of the return light from the recording medium immediately before the laser beam source finishes the high output laser beam emission.

10. An optical information recording reproducing apparatus, comprising:
a first recording unit that irradiates a recording medium with mark recording power laser beam and records information;
a defective area detection unit that detects a defective area included in a recording area based on information on the return light coming from said recording medium using the mark recording power laser beam that is performing recording;
a defective area width detection unit that discriminates the size of the defective area;
a second recording unit that re-records recorded information in another recording area that differs from said recording area;
a first storage unit that stores the site of said defective area;
a second storage unit that stores the re-recorded area; and
a recording prohibition unit that prohibits said defective area stored by said first storage unit from being recorded.

11. The optical information recording reproducing apparatus according to claim 10, further comprising a first reproducing unit that irradiates said recording area with the low power laser beam and reproduces information, a second reproducing unit that irradiates said another recording area in which the information was re-recorded by said second recording unit with the low power laser beam and reproduces the information, and a formation unit that forms the information based on reproduction information obtained from said first reproducing unit and the reproduction information obtained from said second reproducing unit.

12. An optical information recording reproducing apparatus, comprising:
an optical head that irradiates a recording medium with laser beam and detects reflected light from said recording medium;
a servo control circuit that controls a position of said head;
a reproduction circuit that generates reproduction data detected by said head;
a demodulation circuit that demodulates the reproduction data reproduced by said demodulation circuit;
a control circuit that controls said servo control circuit and sends the reproduction data detected by said optical head, reproduced by said reproduction circuit, and demodulated by said demodulation circuit to a host computer, and then to which recording data sent from said host computer is input;
a modulation circuit that converts the recording data input from said control circuit to data suitable for being recorded in said recording medium;

a laser drive circuit that varies laser beam emission intensity in accordance with the recording data from said modulation circuit and records the recording data in said recording medium; and a defective area detection circuit that detects a defective area included in said trial write area based on information on the return light coming from said recording medium using high power laser beam that records trial write information, wherein said optical head is moved to the trial write area of said recording medium by said servo control circuit that received an instruction from said control circuit, irradiates said recording medium with the high power laser beam that records the trial write information from said laser drive circuit and records the trial write information, irradiates the trial write area with low power laser beam from said laser drive circuit, reproduces the trial write area by said reproduction circuit and inputs it to said control circuit, discriminates the power of the laser beam most suitable for data recording by said control circuit based on the trial write reproduction information, and re-records the trial write information in another area that is within said trial write area and differs from said defect area detected by said defective area detection circuit.

13. A recording method, comprising steps of:

performing trial writing to multiple trial write areas by varying laser power;

detecting a defective area of said trial write area using the return light of laser beam by said trial writing; and performing the trial writing again to another trial write area using the same laser power as the laser power with which said defective area was irradiated, wherein the step of detecting said defective area has the step of determining the defective area as a defective area when the width of the defective area is larger than a predetermined width.

14. A recording method, comprising steps of:

performing trial writing to multiple trial write areas by varying laser power;

detecting a defective area of said trial write area using the return light of laser beam by said trial writing; and performing the trial writing again to another trial write area using the same laser power as the laser power with which said defective area was irradiated, wherein said defective area detection step detects a defective area by comparing the luminous energy level of the return light from the recording medium immediately after the laser beam source started high output laser beam emission and the luminous energy level of the return light from the recording medium immediately before the laser beam source finishes the high output laser beam emission.

15. A recording method, comprising steps of:

performing trial writing to multiple trial write areas by varying laser power;

detecting a defective area of said trial write area using the return light of laser beam by said trial writing; and performing the trial writing again to another trial write area using the same laser power as the laser power with which said defective area was irradiated, wherein said defective area detection step discriminates the presence of the defective area from the luminous energy level of the return light coming from the recording medium immediately before the laser beam source finishes the high output laser beam emission.

16. A recording method, comprising the steps of:

performing trial writing to multiple trial write areas by varying laser power;

detecting a defective area of said trial write area using the return light of laser beam by said trial writing;

storing a site of the defective area;

prohibiting the trial writing again on said defective area stored by said storing step; and reproducing data recorded in the trial write area, correcting said reproduced data, and discriminating the optimum laser power when there is the defective area.

* * * * *